(12) United States Patent
Watremetz et al.

(10) Patent No.: US 11,384,984 B2
(45) Date of Patent: Jul. 12, 2022

(54) THERMAL STORAGE UNIT

(71) Applicant: SAINT-GOBAIN CENTRE DE RECHERCHES ET D'ETUDES EUROPEEN, Courbevoie (FR)

(72) Inventors: Benoit Watremetz, Juzennecourt (FR); Thierry Dupin, Avignon (FR); Paul Leplay, Robion (FR)

(73) Assignee: SAINT-GOBAIN CENTRE DE RECHERCHES ET D'ETUDES EUROPEEN, Courbevoie (FR)

( * ) Notice: Subject to any disclaimer, the term of this patent is extended or adjusted under 35 U.S.C. 154(b) by 268 days.

(21) Appl. No.: 15/515,274

(22) PCT Filed: Sep. 29, 2015

(86) PCT No.: PCT/EP2015/072359
§ 371 (c)(1),
(2) Date: Mar. 29, 2017

(87) PCT Pub. No.: WO2016/050732
PCT Pub. Date: Apr. 7, 2016

(65) Prior Publication Data
US 2018/0231316 A1 Aug. 16, 2018

(30) Foreign Application Priority Data
Sep. 29, 2014 (FR) .................................. 1459188

(51) Int. Cl.
*F27D 1/02* (2006.01)
*F27D 1/04* (2006.01)
(Continued)

(52) U.S. Cl.
CPC .............. *F27D 1/042* (2013.01); *C04B 35/16* (2013.01); *C09K 5/14* (2013.01); *F27B 3/263* (2013.01);
(Continued)

(58) Field of Classification Search
CPC . F27D 1/042; F27D 10/45; F27D 1/06; F27D 1/04; F27D 1/45; F27D 1/0006;
(Continued)

(56) References Cited

U.S. PATENT DOCUMENTS 1,207,617 A * 12/1916 Orth .......................... C21B 9/06
165/9.2
1,771,286 A * 7/1930 Brassert .................... C21B 9/06
165/9.2
(Continued)

FOREIGN PATENT DOCUMENTS

DE      198 08 810 C1   6/1999
DE   10 2009 020531 B3   4/2011
GB       2 109 026 A     5/1983

OTHER PUBLICATIONS

Feb. 1, 2016 International Search Report issued in International Patent Application No. PCT/EP2015/072359.

*Primary Examiner* — Harry E Arant
(74) *Attorney, Agent, or Firm* — Oliff PLC

(57) ABSTRACT

Thermal storage unit including: a receptacle including orifices allowing a heat-transfer fluid to be introduced into and extracted, and a stack of bricks, arranged in the receptacle in superposed strata, each stratum having lower and upper large faces and defining a plurality of ducts opening via lower and upper openings, the stack including a pair of strata of a lower and upper stratum, the upper and lower large faces of the lower and upper stratum being separated to define a passage, placing an upper opening of a lower duct of the lower stratum in fluidic communication with at least one lower opening, entirely offset with respect to the upper opening, of at least one upper duct of the upper stratum, the lower large face of the upper stratum closing off, at least
(Continued)

partially, the upper opening, when the upper opening is observed, along its axis, from the lower duct.

32 Claims, 5 Drawing Sheets

(51) Int. Cl.
| | |
|---|---|
| *C04B 35/16* | (2006.01) |
| *F27D 1/00* | (2006.01) |
| *F27B 3/26* | (2006.01) |
| *F28D 17/02* | (2006.01) |
| *F28D 20/00* | (2006.01) |
| *C09K 5/14* | (2006.01) |

(52) U.S. Cl.
CPC ........... *F27D 1/0006* (2013.01); *F28D 17/02* (2013.01); *F28D 20/0056* (2013.01); *C04B 2235/3208* (2013.01); *C04B 2235/3217* (2013.01); *C04B 2235/3232* (2013.01); *C04B 2235/3272* (2013.01); *C04B 2235/72* (2013.01); *Y02E 60/14* (2013.01)

(58) Field of Classification Search
CPC ..... C03B 5/237; F28D 17/02; F28D 20/0056; F27B 3/263; C04B 2235/3272; C04B 2235/72; C04B 2235/3232; C04B 2235/3217; C04B 2235/3208; Y02E 60/14; C09K 5/14

See application file for complete search history.

(56) References Cited

U.S. PATENT DOCUMENTS

| | | | | |
|---|---|---|---|---|
| 2,501,786 | A | * | 3/1950 | Padgett .................... C10B 5/10 202/123 |
| 2,833,532 | A | * | 5/1958 | Ries ........................ F28D 17/02 165/9.1 |
| 3,053,455 | A | * | 9/1962 | Eichenlaub .................. 126/500 |
| 4,768,578 | A | * | 9/1988 | Sulit ....................... C03B 5/237 165/9.4 |
| 2008/0128121 | A1 | | 6/2008 | Zhou |
| 2014/0000835 | A1 | * | 1/2014 | Niknafs ............. F28D 20/0056 165/10 |
| 2014/0144603 | A1 | | 5/2014 | Watremetz |

\* cited by examiner

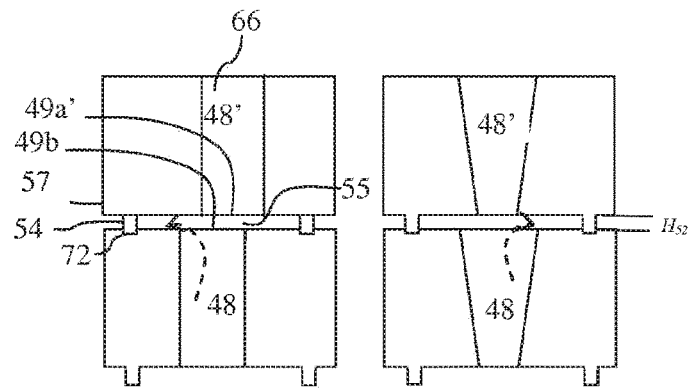
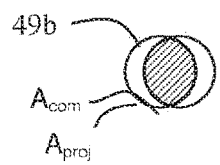
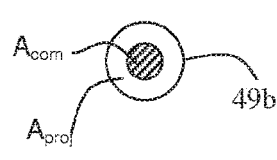
Fig. 3a      Fig. 3b
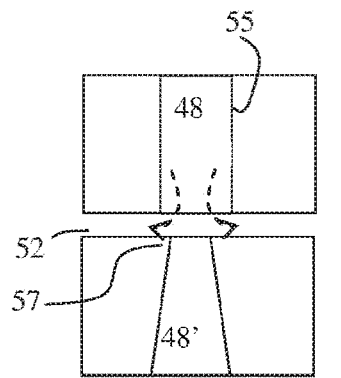
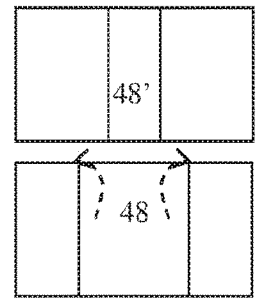
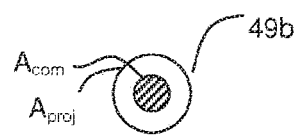
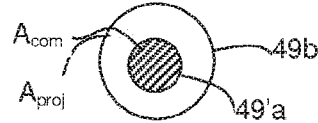
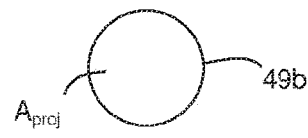
Fig. 3c      Fig. 3d      Fig. 3e

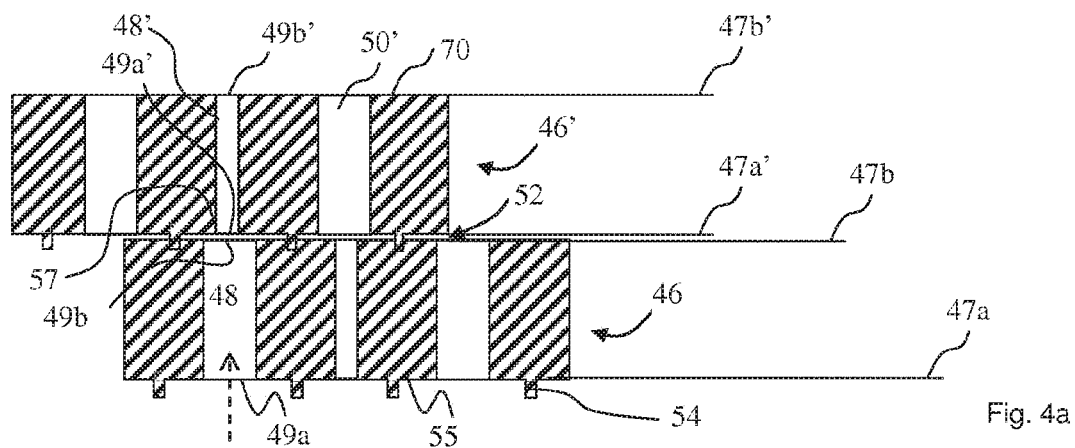
Fig. 4a
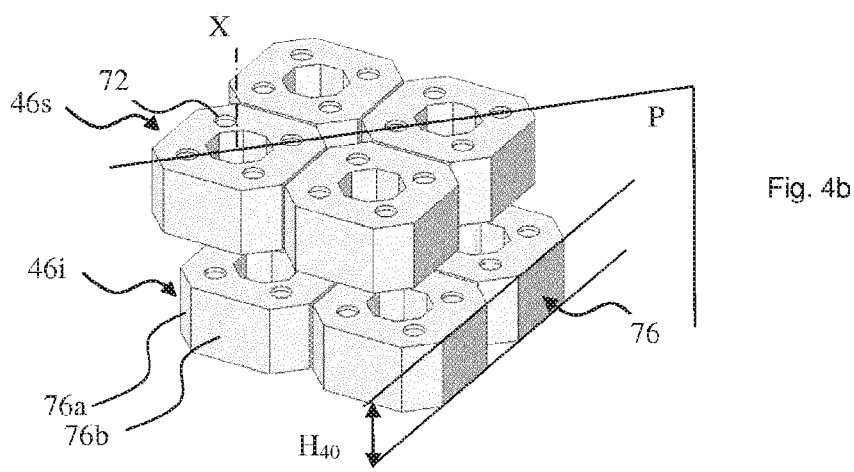
Fig. 4b
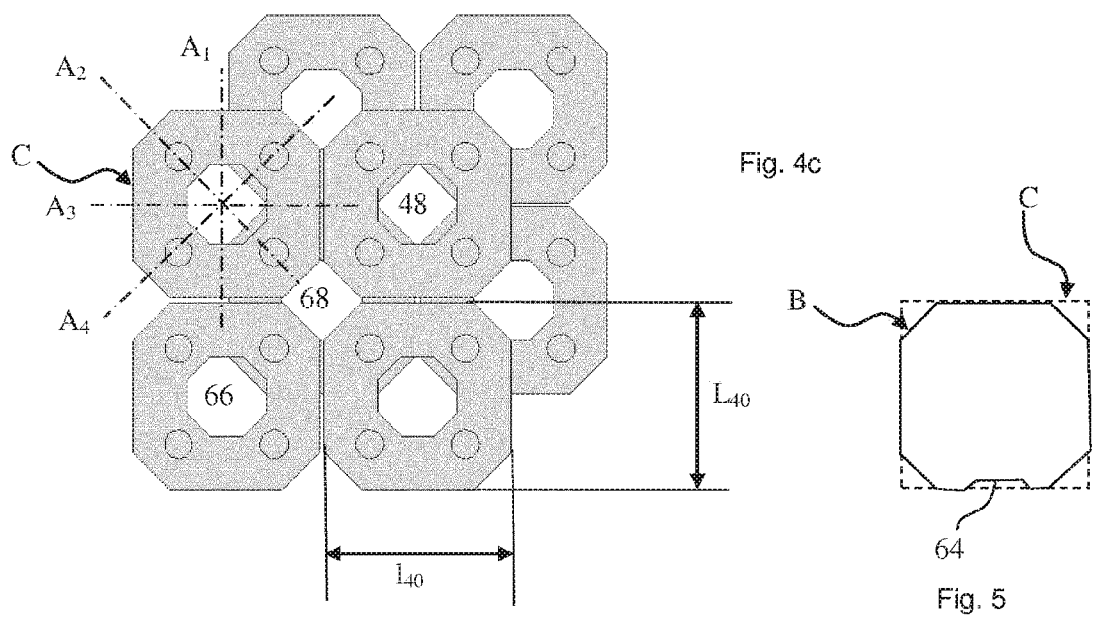
Fig. 4c
Fig. 5

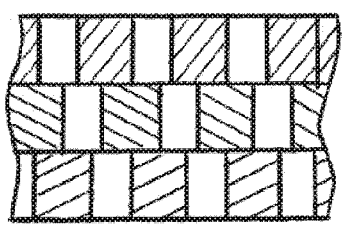
Fig. 8
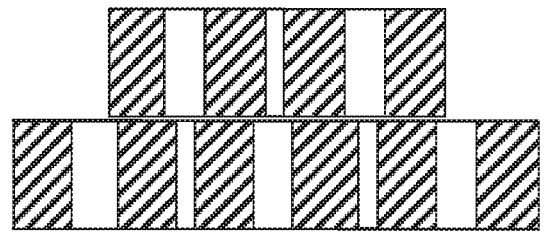
Fig. 12
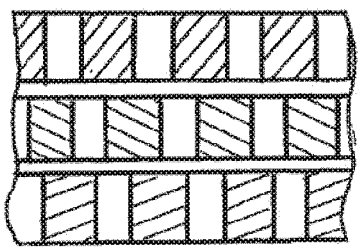
Fig. 9
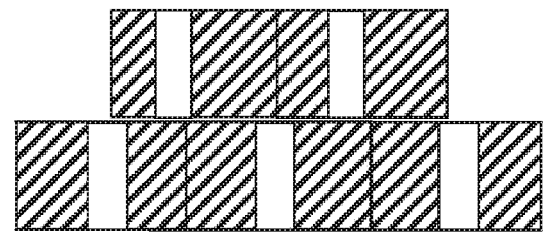
Fig. 13
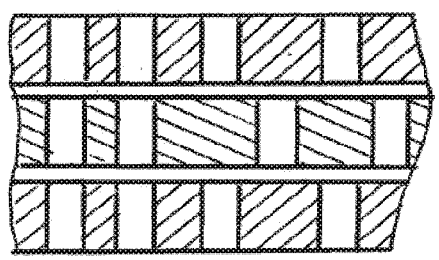
Fig. 10
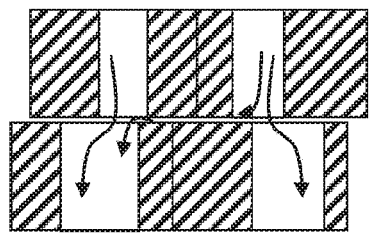
Fig. 14
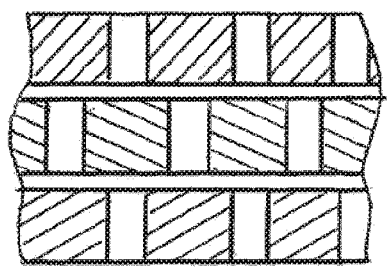
Fig. 11
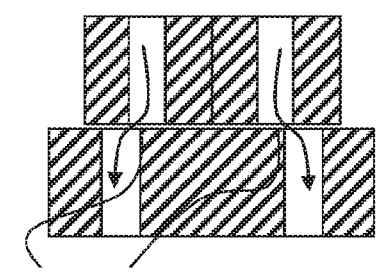
$57_1$  $57_2$  Fig. 15

THERMAL STORAGE UNIT

TECHNICAL FIELD

The invention relates to a thermal storage unit, to a brick intended for such a thermal storage unit and to a method of manufacturing such an installation.

BACKGROUND

A thermal installation may comprise a unit that produces heat energy, a heat-energy consumer and a storage unit for storing this heat energy, so that the production and consumption of same can be offset in time.

The storage of heat energy is also beneficial for making use of soft energy, such as solar energy, which is renewable but the production of which is intermittent. Storage of energy may also be beneficial in order to benefit from the differences in the cost of electricity between what is known as the "off-peak" periods during which electricity costs are the lowest, and what is known as the "peak" periods during which the prices are at their highest. For example, when energy is stored by compressing air, generating heat energy that is stored in a thermal storage unit, the compression phases that require the consumption of electricity are advantageously carried out at lower cost during off-peak hours, whereas the expansion phases that produce electricity are carried out during peak hours so as to supply electricity that can be injected into the electric grid, according to demand, at a profitable cost.

The heat energy may be stored in energy storage elements of a thermal storage unit. The energy storage units may be loose (referred to as "media"), may be in the form of a bed ("packed bed"), for example a bed of stones, or may be stacked in an ordered fashion, conventionally in the form of a stack of bricks.

The operation of storing, by exchange of heat between a stream of heat-transfer fluid and the thermal storage unit, is commonly referred to as "charging", the heat-transfer fluid entering the thermal storage unit during charging being referred to as the "charging heat-transfer fluid".

The storage capacity is notably dependent on the quantity of energy storage material per unit volume. Typically, in order to provide sufficient capacity, the "void volume fraction", which means to say the ratio between the void volume (space not occupied by the material of the media or bricks (ignoring the porosity of this material)) and the volume of the thermal storage unit, is less than or equal to 60%, unlike in regenerators, particularly regenerators used in the glass-making industry.

The heat energy stored may then be released, by exchange of the heat between a stream of heat-transfer fluid and the energy storage elements. This operation is conventionally referred to as "discharge", the heat-transfer fluid entering the thermal storage unit for discharging being referred to as the "discharging heat-transfer fluid".

"A review on packed bed solar energy storage systems", Renewable and Sustainable Energy Reviews, 14 (2010), pp 1059-1069, describes the state of the art in the field of thermal storage units, and notably the influence that certain parameters have on the efficiency of the said thermal storage units.

The efficiency of a thermal storage unit is closely dependent notably on its geometry and on the material of the energy storage elements used to accumulate and release the heat energy. There is a constant need to improve this efficiency and/or to reduce the volume of the thermal storage unit for the same efficiency and quantity of material. This need is all the more keenly felt since environmental regulations and concern to keep expenditure down are encouraging industry always to look for greater energy savings.

It is an object of the invention to meet this requirement, at least in part.

SUMMARY OF THE INVENTION

This object is achieved by means of a thermal storage unit comprising:
- a receptacle comprising orifices allowing a heat-transfer fluid to be introduced into and extracted from the said receptacle, and
- a stack of bricks preferably made of a material which at 25° C. has a specific heat capacity higher than 600 $J \cdot ° C.^{-1} \cdot kg^{-1}$, the said bricks being arranged in the said receptacle in the form of superposed strata, each stratum having lower and upper large faces and defining a plurality of ducts each opening via lower and upper openings onto the said lower and upper large faces respectively, the stack comprising a pair of strata made up of a lower stratum and an upper stratum which is superposed on the said lower stratum, the upper and lower large faces of the said lower stratum and of the said upper stratum, respectively, being separated from one another in such a way as to define a passage, preferably substantially perpendicular to the main direction in which the heat-transfer fluid flows, preferably substantially horizontal, placing an upper opening of a lower duct of the said lower stratum in fluidic communication with a lower opening, that is entirely offset with respect to the said upper opening, of at least one upper duct of the said upper stratum, referred to as an "entirely offset duct", the lower large face of the upper stratum closing off, at least in part, the said upper opening, referred to as "closed-off upper opening", when the said upper opening is observed, along its axis, from the said lower duct, the said pair of strata being referred to as a "passage strata pair", the said bricks being shaped and configured in such a way that the said stack has a void volume fraction less than or equal to 60%.

As will be seen in greater detail in what follows of the description, the passages constitute regions that offer large surface areas for exchange of heat and the closed-off openings (closing-off of the openings downstream of the passages) improve the deflection of some of the flow of heat-transfer fluid towards these passages. A thermal storage unit according to the invention thus has a high storage capacity and a high efficiency.

For preference, the upper large face of the lower stratum also, at least in part, closes off one or more lower openings of upper ducts of the upper stratum when the said lower openings are observed, along their respective axis, from the said upper ducts. The lower openings of the upper stratum thus closed off are referred to as "closed-off lower openings".

Unless indicated otherwise, a feature regarding a "closed-off opening" may relate to a closed-off upper opening or a closed-off lower opening.

A "closed-off opening" may in particular involve a reduction in the passage cross section of the duct and/or a partial offsetting between two openings of ducts that face one another. When an opening of a duct of a stratum is not completely closed off it faces at least one other duct of the other stratum, which may or may not be coaxial with it, referred to as a "corresponding duct". Openings that face one another are also said to be "corresponding". By definition, a "corresponding duct" is therefore different from an "entirely offset duct".

A thermal storage unit according to the invention may also have one or more of the following optional features:

- the degree of closure of a closed-off opening is greater than 10%, or even greater than 20%, or even greater than 30%, or even greater than 40%, or even greater than 50%, or even greater than 60%, or even greater than 70%, or even greater than 80%, or even greater than 90%, or even 100%;
- the degree of closure of more than 70%, preferably of more than 90%, preferably of more than 95% by number of the closed-off upper openings of the said lower stratum is 100%, a degree of closure of 100% being particularly suitable when the heat-transfer fluid is a gas raised to a high pressure, typically greater than 10 bar;
- in one embodiment, the closed-off openings of one and the same stratum have substantially the same degree of closure;
- for a passage strata pair, the closer the said pair is to one end of the stack, the greater on average across the said pair is the degree of closure, it being possible for the variation to exhibit stepped levels across several superposed passage strata pairs;
- in one preferred embodiment, one, preferably at least 10%, preferably at least 30%, preferably at least 50%, preferably at least 70%, preferably at least 90% by number, preferably substantially all of the closed-off upper and/or lower openings are not coaxial with a corresponding lower and/or upper opening respectively and, for preference, the ratio of the surface areas of one opening (independently of the closure) and of a corresponding opening is between 0.1 and 10 or even between 0.1 and 5. In one embodiment, the said ratio is between 0.9 and 1.1 or even substantially equal to 1;
- in one embodiment, one, preferably any, closed-off opening is coaxial with a corresponding opening, the ratio of surface areas of the said closed-off opening (independently of the closure) and of the said corresponding opening preferably being between 0.1 and 10, or even between 0.1 and 5, and preferably greater than 1.1 or less than 0.9;
- the upper large face of the lower stratum closes off, at least in part, a lower opening of the upper stratum, referred to as a "closed-off lower opening", when the said lower opening is observed, along its axis, from the said upper duct;
- the ratio of the number of closed-off upper openings to the number of closed-off lower openings is between 0.7 and 1.3, preferably between 0.8 and 1.2, preferably between 0.9 and 1.1, preferably substantially equal to 1;
- in one embodiment, more than 20%, preferably more than 70%, preferably more than 95% by number of the lower openings of the said upper stratum are closed-off lower openings;
- in one embodiment, for example as depicted in FIG. 12, more than 20% and less than 60% by number of the lower openings of the said upper stratum are closed-off lower openings;
- more than 20%, more than 30%, more than 40%, more than 50%, more than 70%, more than 90% by number, or even all of the said upper openings of the said lower stratum and/or the lower openings of the said upper stratum are closed-off openings closed off by the lower large face of the said upper stratum and/or by the upper large face of the said lower stratum, respectively;
- in one embodiment, more than 20%, more than 30%, more than 40%, more than 50%, more than 70%, more than 90% by number, or even all the said upper openings of the said lower stratum are closed-off openings closed off by the lower large face of the upper stratum and more than 20%, more than 30%, more than 40%, more than 50%, more than 70%, more than 90% by number, or even all of the said lower openings of the said upper stratum are closed-off openings closed off by the upper large face of the lower stratum;
- the features according to the invention of the closed-off upper openings are exhibited by more than 50%, more than 70%, more than 90%, preferably 100% by number of the closed-off lower openings;
- the said passage, preferably any passage, extends substantially horizontally;
- the maximum height of the said passage is greater than 1 mm, or even greater than 2 mm, or even greater than 3 mm and less than 3 cm, preferably less than 2 cm, preferably less than 1 cm;
- the said passage places the said upper opening of the said lower duct in fluidic communication with more than 10%, more than 30%, more than 50%, more than 70%, more than 90%, preferably substantially 100% by number of the lower openings of the upper ducts of the said upper stratum;
- the said passage places more than 10%, more than 30%, more than 50%, more than 70%, more than 90%, or even substantially 100% by number of the upper openings of the lower ducts of the said lower stratum in fluidic communication with more than 10%, more than 30%, more than 50%, more than 70%, more than 90%, or even substantially 100% by number of the lower openings of the upper ducts of the said upper stratum;
- in one embodiment, more than 50%, more than 70%, more than 90%, or even substantially 100% by number of the ducts are perforations;
- in one embodiment, more than 50%, more than 70%, more than 90% or even substantially 100% by number of the ducts have a cross section all the dimensions of which are greater than 5 mm and/or less than 100 mm, than 50 mm, than 30 mm, whatever the plane of section considered, preferably when the temperature is greater than 1000° C., 1200° C. or 1500° C., preferably than the charging temperature;
- for preference, each said duct exhibits, along its length, a passage cross section of which the equivalent diameter is always greater than 5 mm, greater than 10 mm, or even greater than 15 mm, and/or an upper opening and/or a lower opening the equivalent diameter of which is greater than 5 mm, preferably greater than 10 mm, or even greater than 15 mm;
- more than 50%, more than 70%, more than 90%, preferably 100% by number of the superposed strata pairs of the stack are passage strata pairs;
- more than 50%, preferably more than 70%, preferably more than 90%, preferably 100% by number of the passage strata pairs of the stack comprise one, preferably several, preferably all the features of the passage strata pair described hereinabove;
- in one preferred embodiment, the ratio of the number of obstacles that are active in one direction of circulation of the said heat-transfer fluid to the number of obstacles that are active in the other direction of circulation of the said heat-transfer fluid is between 0.7 and 1.3, preferably between 0.8 and 1.2, preferably between 0.9 and 1.1, preferably approximately 1, when considering one passage strata pair, preferably when considering more than 50%, more than 70%, more than 90%, preferably 100% by number of the passage strata pairs of the stack;

the stack of bricks has a void volume fraction less than or equal to 50%, preferably less than or equal to 40%, preferably less than or equal to 30%, preferably less than or equal to 25%, or even less than or equal to 20% and/or greater than or equal to 10%, preferably greater than or equal to 15%;

the stack comprises one, preferably more than 5%, more than 10%, preferably more than 20%, preferably more than 30%, preferably more than 40%, preferably more than 50%, preferably more than 60%, preferably more than 70%, preferably more than 80%, preferably more than 90%, preferably substantially 100% by number of bricks according to the invention, as defined hereinafter;

a loose (media) material is placed between the receptacle and the stack, making it possible to optimize the energy-storage capacity;

the loose media material used is identical to the material used in the stack;

for preference, the minimum size of the loose media particles is greater than the height of the passages so as to prevent them from blocking the said passages;

the stack comprises one or more spacers interposed between the superposed strata so as to create the passage;

for preference, the passage is obtained as a result of the shape of the bricks, preferably by the presence of at least one foot of a brick of the lower stratum or of the upper stratum, the free end of which rests against the lower large face of the upper stratum and/or the upper large face of the lower stratum, respectively;

for preference, the foot is housed in a housing of a brick;

in a longitudinal plane of section containing the axes of two adjacent ducts belonging to one and the same stratum and in fluidic communication via a passage, as depicted in FIG. 15 for example, the obstacles able to deflect heat-transfer fluid coming from the said adjacent ducts into the said passage are not symmetrical, what that means to say is that the obstacles do not act with the same efficiency which means that heat-transfer fluid circulates between the said obstacles;

in the stack, more than 30%, more than 50%, more than 70%, more than 90%, or even 100% of the pairs of two adjacent ducts belonging to one and the same stratum and in fluidic communication via a passage, are configured in such a way that, in a longitudinal plane of section containing the axes of the said adjacent ducts, the obstacles able to deflect heat-transfer fluid coming from the said adjacent ducts into the said passage are not symmetrical;

for preference, the obstacles of the stack are shaped so that more than 50%, more than 70%, more than 90%, preferably 100% by number of the passages of the stack have heat-transfer fluid passing through them during the charging phase and/or during the discharging phase.

The invention also relates, according to a first embodiment, to a brick intended for a thermal storage unit according to the invention, the said brick being delimited by an upper face, a lower face, preferably parallel to the said upper face, and a lateral surface extending, substantially as a virtual cylinder, between the said upper and lower faces and preferably perpendicular to the said upper and lower faces, and comprising a perforation passing through the said brick and opening onto the said upper and lower faces, the perforation and the lateral surface of the brick being shaped in such a way that, in a strata pair made up of said bricks configured in the form of a compact lower stratum and of a compact upper stratum superposed on the said lower stratum, all or some of the interfacial holes at the interface of the lower stratum correspond with perforations of bricks of the upper stratum, and/or all or some of the interfacial holes at the interface between the bricks of the upper stratum correspond with perforations of bricks of the lower stratum, an interfacial hole of a stratum being a duct formed between the bricks of the said stratum and opening onto lower and upper large faces of the said stratum, correspondence between an interfacial hole and a perforation corresponding to a partial closing-off of at least one of the openings of the interfacial hole and of the perforation opposite, a stratum being compact when the bricks of which it is made up occupy a minimal volume.

A brick according to this first embodiment of the invention may also have one or more of the following optional features:

the brick has just one single perforation;

the perforation extends at the centre of the brick.

The invention also, according to a second embodiment, relates to a brick intended for a thermal storage unit according to the invention, the said brick:

being delimited by an upper face, a lower face, preferably parallel to the said upper face, and a lateral surface extending, substantially as a virtual cylinder, between the said upper and lower faces and preferably perpendicular to the said upper and lower faces, the said virtual cylinder preferably having a base of square, hexagonal or octagonal shape, and comprising more than 20, preferably more than 30, preferably more than 40, preferably more than 50, preferably more than 60 perforations passing through the said brick and opening onto the said upper and lower faces, and having a void volume fraction less than or equal to 60% and greater than or equal to 10%, the perforations being shaped and/or distributed and the geometry of the brick being shaped in such a way that, in a strata pair made up of a compact lower stratum made up of said bricks and of a compact upper stratum superposed on the said lower stratum, each said brick can occupy the same space in several operational positions, preferably 2, 3 or 4 positions, the mean degree of closure of the upper openings of the perforations of each said brick being able to vary according to the operational position adopted.

A brick according to this second embodiment of the invention may also have one or more of the following optional features:

the brick has a geometry suited to allowing the change in operational position to result from a rotation of the brick, preferably about the axis of the said virtual cylinder;

the perforations are unevenly distributed through the brick;

at least one perforation is separated from the adjacent perforations by a distance that can vary according to which adjacent perforation is considered;

the perforations are mutually parallel;

more than 50% by number of the perforations each have a mean equivalent diameter greater than 5 mm and less than 25 mm;

the surface density of perforations at the upper surface of the brick is greater than 1000, preferably greater than 1200, preferably greater than 1400 perforations per square metre.

Whatever the embodiment, a brick according to the invention may also have one or more of the following optional features:

the base of the cylinder is shaped to occupy more than 70% and less than 95% of the surface area of the smallest square in which it can be inscribed, and/or having a void volume fraction less than or equal to 60% and greater than or equal to 10%;

the base of the cylinder is octagonal and has four long sides parallel in pairs and four short sides parallel in pairs, each short side being adjacent to two long sides;

the brick comprises a foot protruding from the said upper face or from the said lower face, and a housing on the opposite face to the face that has the foot, so that a foot of another identical brick can be housed in the said housing;

the said foot and the said housing are shaped so that the length of the said foot is greater than the depth of the said housing by more than 1 mm, preferably by more than 2 mm, preferably by more than 3 mm and by less than 3 cm, preferably by less than 2 cm, preferably by less than 1 cm;

the brick is preferably made of a material which, at 25° C., has a specific heat capacity greater than 600 $J \cdot ^\circ C.^{-1} \cdot kg^{-1}$;

the brick is made of a material that exhibits the following chemical analysis, in percentage by mass:
25%<$Fe_2O_3$<90%, and
5%<$Al_2O_3$<30%, and
$CaO$<20%, and
$TiO_2$<25%, and
3%<$SiO_2$<50%, and
$Na_2O$<10%,
provided that $Fe_2O_3+Al_2O_3+CaO+TiO_2+SiO_2+Na_2O$>80%, preferably >85%, or even >90%, and other oxides: balanced to 100%, the said brick has a void volume fraction (ratio between the volume of material (ignoring the porosity of this material) and the volume defined by the exterior surface of the brick (ignoring the perforations)) less than or equal to 60%, preferably less than or equal to 50%, preferably less than or equal to 40%, preferably less than or equal to 30%, preferably less than or equal to 25%, or even less than or equal to 20% and/or greater than or equal to 10%, preferably greater than or equal to 15%;

the said brick has a mass greater than 10 kg and less than 25 kg;

the said brick has corrugations, different from the obstacles, intended to disrupt the circulation of the heat-transfer fluid, these preferably being created in one or several and preferably all of the perforations of the brick and/or over the lateral face and/or over the upper face and/or over the lower face of the brick.

The invention also relates to an assembly comprising:
a thermal storage unit according to the invention, and
a circulation device which:
during a charging phase, causes a charging heat-transfer fluid to circulate through the said thermal storage unit, and
during a discharging phase, causes a discharging heat-transfer fluid to circulate through the said thermal storage unit,
at least one of the said charging and discharging heat-transfer fluids, preferably both the charging and the discharging heat-transfer fluid, circulating in the stack from the said lower duct towards at least one upper duct.

In one embodiment, during discharging, the discharging heat-transfer fluid circulates in the opposite direction to the direction in which the charging heat-transfer fluid circulates during charging.

For preference, more than 50%, more than 70%, more than 90%, preferably 100% by number of the passages of the stack have heat-transfer fluid passing through them during the charging phase and/or the discharging phase.

For preference also, more than 50%, more than 70%, more than 90%, preferably 100% by number of the passages of the stack have heat-transfer fluid passing through them during the charging phase and the discharging phase.

The invention also relates to a thermal installation comprising:
a unit producing heat energy, for example a furnace, a solar tower, or a compressor, and
an assembly according to the invention, the circulation device of the said assembly during a charging phase causing charging heat-transfer fluid to circulate from the unit producing heat energy to the thermal storage unit and then through the said thermal storage unit.

For preference, a thermal installation according to the invention comprises a consumer of heat energy, the said circulation device, during the discharging phase, causing discharging heat-transfer fluid to circulate through the said thermal storage unit, then from the said thermal storage unit to the heat-energy consumer.

The invention relates finally to a method for operating a thermal installation according to the invention, in which method, using the said circulation device,
during a charging phase, a charging heat-transfer fluid is made to circulate from the said unit producing heat energy to a thermal storage unit according to the invention, then through the said thermal storage unit, the said charging heat-transfer fluid entering the said regenerator at a charging temperature Tc, and
during a discharging phase, a discharging heat-transfer fluid is made to circulate through the said thermal storage unit, the discharging heat-transfer fluid entering the said regenerator at a discharging temperature Td.

BRIEF DESCRIPTION OF THE FIGURES

Other objects, aspects, properties and advantages of the present invention will become further apparent in the light of the description and examples that follow and from studying the attached drawing in which:

FIG. 3 (3a-3e) schematically depicts details of stacks of bricks of thermal storage units according to the invention, the bricks being sectioned along their lengths on mid-planes (projections of the lower and upper openings at the interface with the passage have been depicted underneath FIGS. 3a-3c);

FIG. 4 (4a-4c) schematically depicts a detail of a stack of bricks of a thermal storage unit according to one preferred embodiment; FIG. 4b is a perspective view, FIG. 4a is a figure in section on the plane P depicted in FIG. 4b, and FIG. 4c is a view of the assembly depicted in FIG. 4b, from above;

FIG. 5 depicts one example of an outline of a brick that can be used in a thermal storage unit according to the invention;

FIGS. 8, 9, 10 and 11 are schematic diagrams of the assembly achieved in the thermal storage unit of the examples 3, 4, 5 and 6 respectively;

FIGS. 12, 13 and 14 illustrate preferred configurations of bricks; and

FIG. 15 illustrates a "mirrored" configuration that is to be avoided.

In the various figures, identical references are used to denote members that are identical or analogous. Arrows in broken line indicate flows of heat-transfer fluid.

Definitions

The term "thermal installation" is to be understood in the widest sense, as meaning any installation comprising a unit that produces heat energy.

A "unit producing heat energy" is intended to cover not only units specifically intended to generate heat energy, such as a solar tower, but also units which, through their operation, generate heat energy, for example a compressor.

The term "heat-energy consumer" denotes an element capable of receiving heat energy. This may notably result in an increase in the temperature of the consumer (for example in the case of the heating of a building) and/or a conversion into mechanical energy (for example in a gas turbine).

A "stratum" of bricks is intended to mean an assembly of bricks arranged all at the same level in the stack.

Upper and lower openings are said to be "entirely offset" when there is no region of overlap when the lower opening is projected onto the plane in which the upper opening extends. These lower and upper ducts may therefore be in communication only via a passage.

Unless otherwise mentioned, in a passage strata pair, an "obstacle" denotes a part of a stratum that protrudes into the projection of the opening of a duct of an adjacent stratum so that the latter opening is a "closed-off opening".

An obstacle is said to be "active" in a direction of circulation of the heat-transfer fluid when it deflects towards a passage the heat-transfer fluid that is circulating in this direction.

The main direction of flow of the heat-transfer fluid is the direction in which the heat-transfer fluid moves, on average, between the inlet and the outlet of the stack. For preference, the ducts are substantially oriented in this direction.

"Immediately above" or "immediately below" means "positioned on top of and in contact with" or "positioned underneath and in contact with", respectively.

Figure 2:
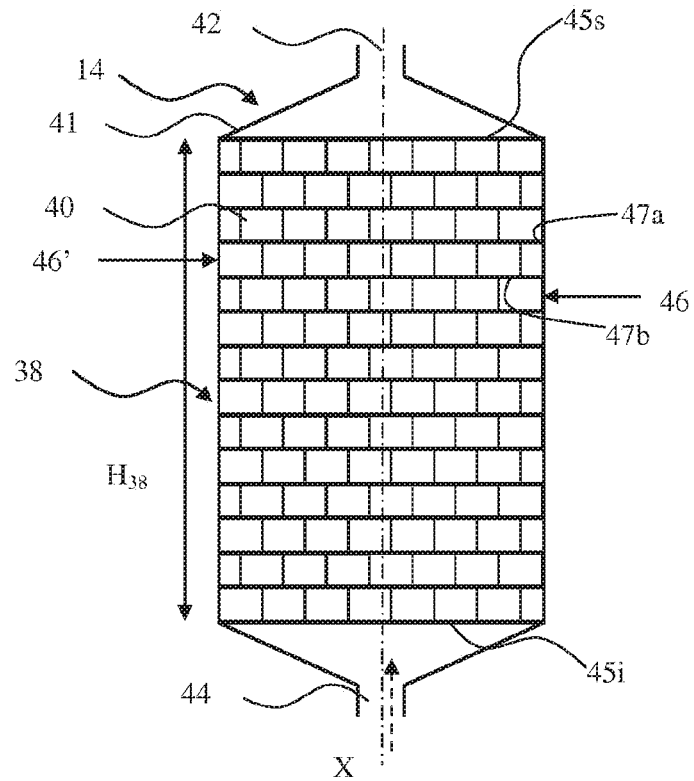
FIG. 2 schematically depicts a thermal storage unit according to the invention.

The adjectives "lower" and "upper" are used for the sake of clarity to correspond to relative positions in a stack that is vertical, as depicted in FIG. 2. With such a stack, the presence of "closed-off upper openings" makes it possible to achieve the desired result if the flow flows from the bottom upwards. Of course, the invention is not, however, restricted to such a flow.

If the flow is from the top down, the stack needs to have "closed-off lower openings". In other words, these adjectives are to be interpreted as being simple nonlimiting references and the scope of the claims is the same as it would have been if the adjectives were replaced by "first" and "second", respectively.

Unless otherwise mentioned, an opening that is "closed off" is partially or fully closed off.

The percentage of the surface area of a closed-off opening that is closed off is referred to as the "degree of closure". A degree of closure of 100% corresponds for example to total closure.

A "perforation" is a duct passing through a brick.

The "mean" equivalent diameter of a perforation opening onto upper and lower faces of a brick is the mean of the equivalent diameters of the openings of the perforation on the said upper and lower faces.

The "equivalent" diameter of an opening is the diameter of a disc that has the same surface area as the said opening.

"Transverse" means "perpendicular to the lengthwise direction".

"Ceramics material" means a material that is neither organic nor metallic.

The oxide contents refer to the overall contents for each of the corresponding chemical elements, expressed in the form of the most stable oxide, according to the convention that is commonplace in that industry.

Conventionally, the melting point is measured at atmospheric pressure, for example using differential scanning calorimetry (DSC).

"Fluidic communication" between two locations means that a fluid is able to circulate between these two locations and not that such circulation will actually occur during operation.

Unless otherwise mentioned, all the percentages are percentages by mass.

Unless otherwise mentioned, the dimensions are measured at ambient temperature (20° C.).

"Containing a", "comprising a" or "having a" means "having at least one" unless indicated otherwise.

DETAILED DESCRIPTION

Figure 1:
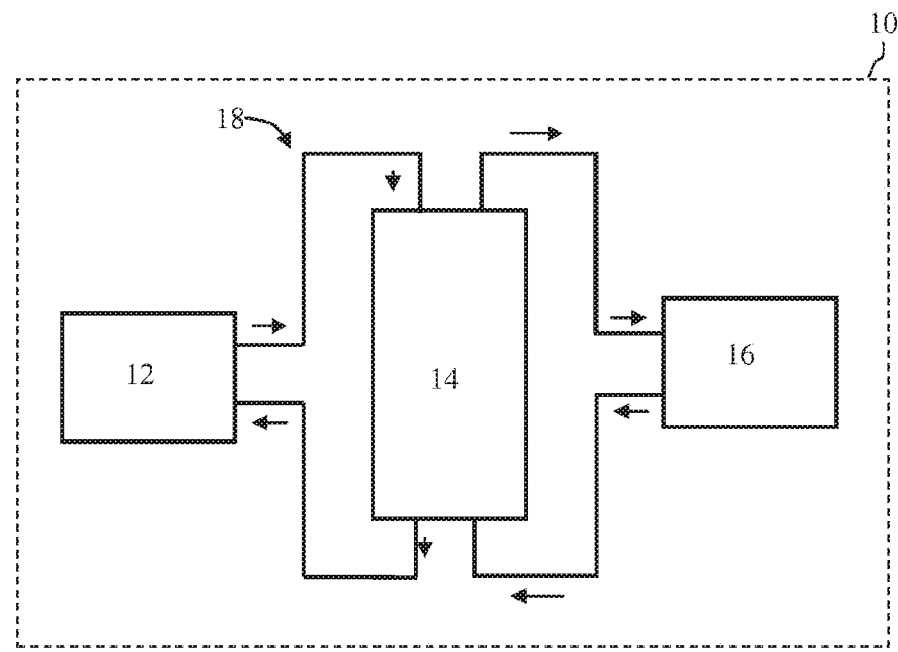
FIG. 1 schematically depicts a thermal installation according to the invention.

The thermal installation 10 according to the invention depicted in FIG. 1 comprises a unit producing heat energy 12, a thermal storage unit 14, a heat-energy consumer 16 and a circulation device 18.

The unit producing heat energy 12 may for example be a furnace or a solar tower or a compressor. For preference, the unit producing heat energy produces more than 50 kWh, or more than 100 kWh, or even more than 300 kWh, or even more than 1 MWh, or even more than 5 MWh of heat energy.

The heat-energy consumer 16 may for example be a building or a collection of buildings, a tank, a pool, a turbine coupled to an alternator for generating electricity, an industrial installation that uses steam, for example the paper pulp industry, or a steam boiler.

The circulation device 18 comprises in the conventional way a collection of pipes, valves and pumps/ventilators/extractors controlled in such a way that the thermal storage unit may be placed selectively in communication with the unit producing heat energy 12 so that this device can receive a charging heat-transfer fluid leaving the said unit, during charging phases, and with the heat-energy consumer 16 so that the heated-up discharging heat-transfer fluid leaving the thermal storage unit can heat up the said consumer or, more generally, transfer heat energy to the said consumer, during the discharging phases, and so as to be able to force the circulation of the charging heat-transfer fluid and/or of the discharging heat-transfer fluid through the thermal storage unit 14.

The charging and discharging heat-transfer fluids may or may not be of the same nature.

The heat-transfer fluid used for charging and/or discharging the thermal storage unit may be a gas, for example air, steam, or a heat-transfer gas, or may be a liquid, for example water, a thermal oil, molten salts or molten metals or alloys.

Thermal Storage Unit

FIG. 2 depicts one example of a thermal storage unit 14. This thermal storage unit comprises a stack 38 of longitudinal axis X, preferably substantially vertical.

In one embodiment, the thermal storage unit comprises several separate stacks notably so as to limit the weight supported by the strata at the bottom of each stack.

The stack 38, made up of bricks 40, is placed in a receptacle 41, for example made of metal or ceramics material, having an upper orifice 42 and a lower orifice 44 via which orifices, for preference, the charging and discharging heat-transfer fluids respectively enter the thermal storage unit. For preference, the charging and discharging heat-transfer fluids leave the thermal storage unit 14 via the lower 42 and upper 44 orifices respectively.

The height $H_{38}$ of the stack 38 between the upper face 45$s$ and the lower face 45$i$ thereof is preferably greater than 1 m, preferably greater than 5 m, preferably greater than 15 m, preferably greater than 25 m, or even greater than 35 m, or even greater than 50 m.

The mass of the stack 38 is preferably greater than 1 T, preferably greater than 10 T, or even greater than 100 T, or even greater than 500 T, or even greater than 700 T, or even greater than 2000 T, or even greater than 4000 T, or even greater than 5000 T, or even greater than 7000 T.

The stack 38 is a superposition of strata 46 or "levels". The strata 46 preferably extend substantially horizontal. In one embodiment, the strata have substantially the same height. In one embodiment, substantially all the bricks of a stratum are identical. The bricks of one stratum may be identical to or different from the bricks of another stratum.

The strata density in the heightwise direction is preferably greater than or equal to 5 strata per metre and/or less than 15 strata per metre.

Two superposed strata form a "pair" of strata or "strata pair". The first of the strata through which the heat-transfer fluid passes is referred to as the "lower stratum", the second being referred to as the "upper stratum". In the following section of the description and for the sake of clarity, all the references relating to an object of an upper stratum are accompanied by a "prime" symbol.

Each stratum therefore belongs to a pair in which it constitutes the lower stratum 46 and a pair in which it constitutes the upper stratum 46' (except for the strata at the ends of the stack which belong to just one strata pair).

A stratum 46 defines, with respect to the direction in which the charging fluid flows (arrow in broken line in FIG. 2 or in FIG. 4$a$), a lower large face 47$a$ and an upper large face 47$b$.

Within a strata pair, the upper large face of the lower stratum 46 faces the lower large face of the upper stratum 46'.

Each stratum is made up of bricks 40.

The bricks of one stratum may be exactly superposed on those of a stratum immediately below, without overlap. However, for preference, as depicted in FIG. 4, one stratum is laterally offset with respect to the stratum over which it extends. In other words, the bricks of these two strata are not exactly superposed on top of one another, a brick of the upper stratum resting on several bricks of the lower stratum. This improves the stability of the stack.

Within one and the same stack, certain strata may be in exact superposition and others may be laterally offset.

All the bricks of a stratum or of the stack (with the possible exception of the bricks at the periphery of the stratum or of the stack) may have the same or different shapes or sizes.

Two strata superposed one on top of the other may be made of bricks that have the same or different shapes or sizes.

The bricks 40 are shaped and/or configured, preferably uniformly, to constitute ducts 48. As depicted in FIG. 4$a$, each duct 48 of a stratum 46 opens onto the lower large face 47$a$ and upper large face 47$b$ of the strat via a lower opening 49$a$ and an upper opening 49$b$.

The ducts 48 of the superposed strata are in fluidic communication so as to allow the charging and discharging heat-transfer fluids to circulate through the stack between the inlet and outlet orifices.

The ducts 48 are preferably substantially rectilinear. They preferably all extend substantially parallel to the axis X of the stack.

In a pair of strata 46-46', the two superposed strata are spaced apart from one another to create a passage 52. A pair of strata which are separated by a passage 52 is referred to as a "passage strata pair". For preference, more than 50%, more than 80%, even 100% by number of the strata pairs of the stack are passage strata pairs.

As depicted in FIG. 4$a$ for example, a passage 52 connects lower ducts 48 and entirely offset upper ducts 50' of the lower 46 and upper 46' strata of a passage strata pair. For preference, each passage 52 places more than 2, more than 3, more than 4, more than 5 ducts 48 in fluidic communication with entirely offset ducts 50', and/or, for preference, more than 10%, more than 50%, more than 70%, more than 90%, or even substantially 100% by number of the ducts 48 in fluidic communication with entirely offset ducts 50'. For preference, a passage 52 places all the lower and upper ducts in fluidic communication with one another.

Spacers may be positioned between the said strata. For preference, the spacers are formed as an integral part of the bricks 40, the spacers and the bricks forming a monolithic entity. They may for example take the form of feet 54 protruding from the lower face 55 of the bricks, as described hereinafter.

For preference, the height $H_{52}$ of a passage 52 is greater than 1 mm, or even greater than 2 mm, or even greater than 3 mm and less than 3 cm, preferably less than 2 cm, preferably less than 1 cm. Advantageously, the thermal storage unit according to the invention offers a good compromise between a high mass of bricks (or "thermal mass") and an acceptable pressure drop.

In one embodiment, all the passages of the stack have identical dimensions and, in particular, heights. In another embodiment, the height of the passages varies according to their position along the axis X of the stack.

In the embodiments depicted, the passages 52 extend transversely, which means to say perpendicular to the axis X. In one embodiment, all the bricks of one stratum are in contact with one another so that there is substantially no communication between various ducts of a stratum except via the passages 52. For preference, the bricks are, however, configured in such a way that at ambient temperature there is a lateral expansion space, at the periphery of the bricks, so as partially or completely to absorb the thermal expansion of the bricks. This increases the life of the bricks and of the thermal storage unit. The bricks are separated from one another according notably to the thermal expansion of the material of the bricks, the dimensions of the bricks and the operating temperature of the bricks. For example, a separation of greater than 2 mm between two bricks 20 cm wide is highly suitable for an operating temperature of the order of 900° C. when the bricks are made of a material that exhibits the following chemical analysis, in percentage by mass on the basis of the oxides:

25%<$Fe_2O_3$<90%, and
5%<$Al_2O_3$<30%, and
$CaO$<20%, and
$TiO_2$<25%, and
3%<$SiO_2$<50%, and
$Na_2O$<10%,
provided that $Fe_2O_3+Al_2O_3+CaO+TiO_2+SiO_2+Na_2O$>80%, preferably >85%, or even >90%, and other oxides: balanced to 100%.

In a stack of bricks of a conventional thermal storage unit, the lateral expansion spaces between adjacent bricks, which correspond to leakage flow rates, are not suitable for use as ducts.

In particular, in service, these expansion spaces become smaller or even disappear. For preference, according to the invention, the ducts always have a cross section all the dimensions of which are greater than 5 mm and/or less than 100 mm, than 30 mm, whatever the plane of section considered, preferably when the temperature is greater than 1000° C., 1200° C. or 1500° C., preferably at the charging temperature.

For preference, each duct along its entire length has a passage cross section of which the equivalent diameter is always greater than 5 mm, greater than 10 mm, or even greater than 15 mm, and/or an upper opening and/or a lower opening the equivalent diameter of which is greater than 5 mm, preferably greater than 10 mm, or even greater than 15 mm.

The combination of the obstacles 57 and of the passages 52 advantageously allows a three-dimensional circulation to be set up throughout the volume of the receptacle and makes it possible to increase considerably the surface area available for exchange of heat. Furthermore, a high number of passages makes it possible to reduce the speed of the heat-transfer fluid through these passages, thereby ensuring that the time of contact with the bricks is long enough for a high quantity of heat energy to be transferred.

For preference, more than 50%, preferably more than 80%, preferably 100% by number of the passage strata pairs comprise an obstacle 57 to encourage the heat-transfer fluid to flow (in one direction in which the said heat-transfer fluid passes) through the passage 52 of the strata pair.

As depicted for example in FIG. 4a, one and the same stratum may comprise one or more first obstacles that are active in the first direction of flow and one or more second obstacles that are active in the second direction of flow. The obstacles that are active in the first direction of flow may represent more than 30%, more than 40%, preferably substantially 50% by number of the active obstacles of one and the same stratum, preferably of the stack.

In a pair of strata 46-46' with a passage, or passage strata pair, the presence of an obstacle 57 corresponds to the situation in which, when the upper opening 49b of a lower duct 48 of the lower stratum 46 is projected normally (namely in a plane transverse to the overall direction of the flow) onto the lower large face 47a' of the upper stratum 46', the intersection of this projected area $A_{proj}$ and of the lower openings 49a' which extend in the said lower large face 47a' has a surface area that is smaller than the surface area of the said lower opening.

In particular, if this projection intersects with just one lower opening of surface area $A_{am}$, and if the surface area of the said intersection is referred to as $A_{com}$, then $A_{com}<A_{proj}$ (FIG. 3d). For preference, the ratio $A_{com}/A_{proj}$ (ratio R) is less than 0.9, less than 0.8, less than 0.7, less than 0.6, less than 0.5, less than 0.4, less than 0.3, less than 0.2, less than 0.1, or even equal to 0, this value being chosen according to operating constraints, notably according to the pressure drop that is permissible across the heat storage unit.

The upper stratum 46' thus at least partially "closes off" the upper opening 49b of the lower stratum 46 when observed from the lower duct 48, as depicted in FIGS. 3a-3d.

The choice of the ratio R is dependent on the conditions of use of the thermal storage unit. In particular, when the heat-transfer fluid is a gas raised to a high pressure, typically greater than 10 bar, the ratio R is preferably greater than or equal to 0 and less than 0.7, preferably less than 0.5, or even less than 0.3, or even less than 0.1. When the heat-transfer fluid is a gas at a pressure of less than 10 bar, the ratio R is preferably greater than 0.7.

The said closure may be the result of an upper duct 48' facing the lower duct 48 and which has a lower opening 49a' of a surface area less than that of the upper opening 49b of the lower duct 48, as in FIGS. 3b to 3e and 4a. Closure then corresponds to a discontinuity, namely a sudden change in cross section for flow between the lower and upper ducts.

Closure may be total, as in FIG. 3e in which $A_{com}=0$.

Said closure may also be the result of an offsetting of two openings, having identical or different surface areas, of ducts 48 and 48' which face one another, as in FIG. 3a.

Such an offset may be systematic from one stratum to another, or may be applied just to part of the stack.

Modelling or simple trial and error allow the sizing and positioning of the obstacles to be optimized according to the operating conditions and, in particular, according to the nature and flow rate of the heat-transfer fluids.

In one embodiment, all the obstacles are identical. The obstacles may also vary according to their location, particularly according to the position of the passage strata pair along the axis X of the stack. For preference, the closer the obstacles are positioned to the orifice via which a heat-transfer fluid is introduced into the stack, the more pronounced they are, which means to say the more they modify the flow of the heat-transfer fluid. This improves performance.

The shape and configuration of the bricks and the operating conditions are determined to encourage circulation through the passages. In particular, it is preferable to avoid configurations in which several obstacles are positioned to deflect the heat-transfer fluid into one and the same passage, but under flow conditions that leads to a limited circulation, or even to an absence of circulation of fluid in the passage. For example, in a plane of section as depicted in FIG. 15, the passage is flanked by two obstacles $57_1$ and $57_2$ that act with the same effectiveness (a "mirror" configuration with respect to the passage), leading to a substantially zero circulation.

FIGS. 12, 13 and 14 illustrate preferred configurations:

As illustrated in FIG. 12, in one preferred embodiment, more than 20%, preferably more than 30%, preferably more than 40% and preferably less than 60% by number of the upper openings of the said lower stratum are closed-off openings, and more than 70%, preferably more than 80%, preferably more than 90%, preferably more than 95%, substantially 100% of the closed-off upper openings are coaxial with a corresponding lower opening of an upper duct, the ratio of the surface areas of a closed-off upper opening (independently of the closure) and of the said coaxial lower opening being greater than 0.1, or even greater than 0.5 and less than 10, preferably less than 5, preferably less than 2, preferably less than 1, preferably less than 0.9, preferably less than 0.8.

For preference and, in particular, if a heat-transfer fluid is able to circulate in both directions, the stack comprises obstacles that are active in the other direction. For preference, more than 20%, preferably more than 30%, preferably more than 40%, and preferably less than 60% by number of the lower openings of the said upper stratum are closed-off openings, and more than 70%, preferably more than 80%, preferably more than 90%, preferably more than 95%, preferably substantially 100% of the closed-off lower openings are coaxial with a corresponding upper opening of a lower duct, the ratio of the surface areas of a closed-off lower opening (independently of the closure) and of the said coaxial upper opening being greater than 0.1, or even greater than 0.5 and less than 10, preferably less than 5, preferably less than 2, preferably less than 1, preferably less than 0.9, preferably less than 0.8.

For preference, the ratio of the number of obstacles that are active in one direction of circulation of the said heat-transfer fluid to the number of obstacles that are active in the other direction of circulation of the said heat-transfer fluid is between 0.7 and 1.3, preferably between 0.8 and 1.2, preferably between 0.9 and 1.1, preferably around 1.

For preference, more than 50%, more than 70%, more than 90%, preferably 100% by number of the passage strata pairs of the stack have a configuration that exhibits one or more and preferably all of the features of this embodiment.

As illustrated in FIG. 13, in one preferred embodiment, more than 20%, preferably more than 30%, preferably more than 40%, preferably more than 50%, preferably more than 70%, preferably more than 90% by number, or even all of the upper openings of the said lower stratum are totally closed-off openings closed off by the lower large face of the upper stratum, and preferably more than 20%, preferably more than 30%, preferably more than 40%, preferably more than 50%, preferably more than 70%, preferably more than 90% by number, or even all of the said lower openings of the said upper stratum are totally closed-off openings closed off by the upper large face of the lower stratum, and preferably the upper and lower openings have substantially the same equivalent diameter.

This embodiment is particularly suitable when the heat-transfer fluid is a gas raised to a high pressure, typically greater than 10 bar.

For preference, more than 50%, more than 70%, more than 90%, preferably 100% by number of the passage strata pairs of the stack have a configuration exhibiting one or more, preferably all of the features of this embodiment.

As illustrated in FIG. 14, in one preferred embodiment, more than 20%, preferably more than 30%, preferably more than 40%, preferably more than 50%, preferably more than 70%, preferably more than 90%, preferably more than 95%, preferably substantially 100% by number of the upper openings of the said lower stratum are closed-off openings, and more than 70%, preferably more than 80%, preferably more than 90%, preferably more than 95%, substantially 100% of the said closed-off upper openings are not coaxial with a corresponding lower opening of an upper duct, and the ratio of the surface areas of a partially closed-off upper opening (independently of the closure) and of the corresponding lower opening is greater than 0.1, or even greater than 0.5, or even greater than 0.9 and less than 10, or even less than 5, or even less than 2, or even less than 1.1.

For preference, and particularly if the heat transfer fluid is capable of flowing in both directions, the stack has obstacles that are active in both directions. For preference, more than 20%, preferably more than 30%, preferably more than 40%, preferably more than 50%, preferably more than 70%, preferably more than 90%, preferably more than 95%, preferably substantially 100% by number of the lower openings of the said upper stratum are closed-off openings closed off by the upper large face of the lower stratum; and more than 70%, preferably more than 80%, preferably more than 90%, preferably more than 95%, or even substantially 100% of the said closed-off lower openings are not coaxial with a corresponding upper opening of a lower duct, and the ratio of the surface areas of a partially closed-off lower opening (independently of the closure) and of the said corresponding upper opening is greater than 0.1, or even greater than 0.5, or even greater than 0.9 and less than 10, or even less than 5, or even less than 2, or even less than 1.1.

The degree of closure is preferably greater than 10%, preferably greater than 20%, preferably greater than 30%, preferably greater than 40%, preferably greater than 50%, or even greater than 60%, greater than 70%, greater than 80%, greater than 90%.

The degree of closure is preferably determined according to operating constraints, notably according to the pressure drop permissible across the heat storage unit.

For preference, more than 50%, more than 70%, more than 90%, preferably 100% by number of the passage strata pairs of the stack have a configuration that exhibits one or more, preferably all of the features of this embodiment.

In general, the closer the said pair is to one end of the stack, the greater on average is the degree of closure across the said passage strata pair, it being possible for the variation to exhibit stepped levels across various superposed passage strata pairs. When several stacks are placed in the receptacle and configured such that the heat-transfer fluid passes successively through them, preferably the closer a passage strata pair is to the most upstream and/or the most downstream end of the stack, the higher, on average across a passage strata pair, the degree of closure, it being possible for the variation to exhibit stepped levels across several superposed passage strata pairs.

Brick

The material of which the bricks 40 are made is suited to the heat-transfer fluids that come into contact with the bricks. For preference, it has a pyroscopic resistance measured in accordance with standard ISO 528 (1983) higher than the charging temperature $T_c+50°$ C., or even higher than $T_c+100°$ C., or even higher than $T_c+150°$ C. and less than 1900° C., or even less than 1800° C., or even less than 1700° C., or even less than 1650° C., thus excluding any risk of collapse.

The material of which the bricks are made preferably has, at 25° C. a specific heat capacity greater than 600 J·° C.$^{-1}$·kg$^{-1}$, or even greater than 650 J·° C.$^{-1}$·kg$^{-1}$, or even greater 700 J·° C.$^{-1}$·kg$^{-1}$. The specific heat capacity may be measured in accordance with standard ASTM E1269, for example using Netzsch STA 409 CD differential scanning calorimetry (DSC) equipment.

For preference, the material of which the bricks are made is a ceramics material. For preference, it consists of oxides for more than 90% of its mass, preferably more than 95%, preferably more than 99% or even substantially 100%. For preference also, it contains more than 50%, preferably more than 60%, preferably more than 70%, or even more than 80% zirconia and/or magnesia and/or alumina and/or magnesium aluminate spinel, for example $MgAl_2O_4$, and/or steatite and/or forsterite $Mg_2SiO_4$, and/or ilmenite $FeTiO_3$, and/or iron oxides, preferably alumina and/or iron oxides. In one embodiment, the mass balance to 100% comprises, or even consists of in the case of more than 90% of the mass thereof, at least one oxide chosen from boron oxide, sodium oxide, the oxides of copper, silica and mixtures thereof.

For preference, the material of which the bricks are made has the following chemical analysis, in percent by mass:
25%<$Fe_2O_3$<90%, and
5%<$Al_2O_3$<30%, and
$CaO$<20%, and
$TiO_2$<25%, and
3%<$SiO_2$<50%, and
$Na_2O$<10%, and
provided that $Fe_2O_3+Al_2O_3+CaO+TiO_2+SiO_2+Na_2O$>80%, preferably >85%, or even >90%,
and other oxides: balanced to 100%.

For preference, the material is a frit. For preference, it has an open porosity greater than 4% and/or less than 30%, preferably less than 25%, or even less than 20%, or even less than 15%.

The shapes and dimensions of the bricks, and notably of the perforations, are nonlimiting, provided that they allow dense stacking, which means to say stacking with a low void fraction, preferably less than or equal to 50%, preferably less than or equal to 40%, preferably less than or equal to 30%, or even less or equal to 20%.

For preference, the mass of a brick is greater than 10 kg and less than 25 kg.

In the preferred embodiment, the height $H_{40}$ and/or the width $I_{40}$ and/or the length $L_{40}$ of a brick is preferably greater than 10 cm, or even greater than 15 cm, or even greater than 20 cm, or even greater than 25 cm and/or preferably less than 80 cm, preferably less than 50 cm, preferably less than 40 cm.

For preference, the brick is a profile section, which means to say that its cross section is constant over substantially its entire height. Its cross section is delimited externally by an outline B which forms the base of the cylinder that defines the profile section and may in particular be polygonal, for example triangular, square, rectangular, hexagonal or octagonal (see FIG. 4c). For preference, the polygonal shape is a regular polygon. The outline may also exhibit local bulges or indentations 64 (FIG. 5). For preference, the outline B has two axes of symmetry, more preferably still, four axes of symmetry. In the embodiment depicted in FIG. 4, these axes of symmetry are included in four planes of symmetry $A_1$-$A_4$ running parallel to the lateral faces.

The outline B is determined such that it preferably occupies more than 80% and less than 95% of the surface of the smallest square C inside which it can be inscribed (see FIG. 5).

A duct 48 may take the form of a perforation 66 or of an interfacial hole 68 at the interface between several adjacent bricks of a stratum.

In one preferred embodiment, the brick comprises one, preferably only one, perforation 66 passing right through it along its height.

For preference, the outline B of the cross section of the bricks is shaped such that by placing several said bricks side by side, interfacial holes 68, preferably passing through the stratum over its entire height and preferably parallel to the heightwise direction are formed at the interface between the bricks. For preference, the outline is determined so that more than 2, more than 3 and/or less than 10, less than 8, less than 5 interfacial holes 68 can be formed.

It is possible for the brick not to be a profile section. In particular, the cross section (perpendicular to the heightwise direction) of the said perforations and of the said interfacial holes may vary over the height of a brick, as depicted in FIGS. 3a-3c for example.

The outline of the cross section of the said perforations and of the said interfacial holes may be constant or may vary over the height of a brick. It may notably be circular or polygonal. In one embodiment, the outlines of the cross sections of the said perforations and of the said interfacial holes respectively are circular and polygonal, preferably square, respectively, as in FIG. 4.

The shape of the perforations 66 and of the interfacial holes 68 is nonlimiting.

For preference, a brick comprises an anchoring device allowing the said brick to be held in position with respect to the adjacent bricks or bricks belonging to a stratum immediately above and/or below.

For preference, the brick comprises one, preferably several, feet 54 preferably protruding from the lower face 55 or from the upper face 70 of the brick and, for preference, one, preferably several, housings 72, preferably on the upper face or on the lower face of the brick, respectively, to accept the feet of one or more bricks of a stratum extending immediately above or below the said brick, respectively. Collaboration between the feet and the housings makes positioning the bricks easier and improves the stability of the stack by allowing the bricks to anchor on one another.

For preference, the height of the feet 54 is determined so as to ensure an axial spacing (in the direction X) $H_{52}$ between the strata, thus creating the passages 52 between the ducts.

For preference, the bricks of the lower stratum and of the upper stratum comprise at least one foot and at least one housing the dimensions and the positioning of which make it possible to adjust the magnitude of the height of the passage and/or the magnitude of the obstacle or obstacles and/or the magnitude of the lateral expansion space.

For preference, the bricks of the upper stratum and/or of the lower stratum
  comprise at least one foot, preferably at least two feet, preferably at least three feet, the free end of which rests against the upper and/or lower large face of the lower stratum and/or of the upper stratum, respectively, so as to define the said passage, and is preferably housed in a housing of a brick that partially defines the said lower and/or upper large face, respectively, and/or
  comprise a base having more than three sides, which is preferably square, hexagonal or octagonal, have at least one perforation defining a duct, preferably rectilinear.

FIG. 4b shows a brick according to the invention in a first preferred embodiment.

The brick 40 is a profile section along the X axis, defining the heightwise direction. Laterally, the brick 40 is delimited by a lateral surface 76 made up of 8 lateral faces. The lateral faces comprise four identical small lateral faces 76a and four identical large lateral faces 76b alternating with the small lateral faces 76a. Each small lateral face 76a and large lateral face 76b respectively is opposite and parallel to another small lateral face 76a or large lateral face 76b respectively. When viewed along the axis X, the brick thus has a cross section externally delimited by a substantially square outline B the corners of which have been cut off by the small faces 76a, the internal angle between two consecutive lateral faces being equal to 135°. In an embodiment that has not been depicted, the outline B forms a regular octagon, the 8 sides all having the same length and the internal angle between two consecutive sides being equal to 135°.

The brick 40 has a perforation 66 passing substantially right through its centre, in the heightwise direction between a lower face 62 and an upper face 64 that are substantially facing and parallel to each other.

The central perforation 66 is substantially cylindrical, of substantially polygonal, preferably octagonal, cross section. It extends parallel to the axis X, which means to say substantially perpendicular to the lower 62 and upper 64 faces.

The cross section of the central perforation is preferably less than 0.6 times, preferably less than 0.5 times, preferably less than 0.4 times, preferably less than 0.3 times, preferably less than 0.25 times, and for preference, greater than 0.1 times, preferably greater than 0.15 times the cross section of the brick in the plane of the said section.

In collaboration with three adjacent bricks, each brick makes it possible to create four interfacial holes 68 which extend along the entire height of the stratum containing the said bricks.

In an embodiment that has not been depicted, the bricks are put together in such a way that the perforations 66 are substantially aligned from one stratum to the next, preferably with a partial overlap so as to create obstacles. Advantageously this limits pressure drops.

In the embodiment depicted in FIG. 4, the bricks are set up in such a way that at least part of the perforations 66 are not aligned from one stratum to the next (axis offset). For preference, the perforations 66 of one stratum open into interfacial holes 68 of an adjacent stratum, preferably with a partial overlap so as to create obstacles. This advantageously improves exchange of heat.

In the embodiment depicted in FIG. 4, each brick on its upper face comprises four housings 72 which collaborate with four feet 54 protruding from the lower face of bricks of the stratum immediately above, the height of the feet 54 being greater than the depth of the housings 72 so as to create the passages 52.

For preference, in a preferred embodiment, a brick according to the invention comprises an upper face, a lower face, preferably parallel to the said upper face, and a lateral surface extending substantially according to a virtual cylinder between the said upper and lower faces and preferably perpendicular to the said upper and lower faces, the said virtual cylinder having a base preferably having a polygonal overall shape, preferably having at least eight sides, preferably which is octagonal with two axes of symmetry perpendicular to one another, preferably having four axes of symmetry equiangularly distributed about a common intersection centre, preferably with four short sides of the same length and four long sides of the same length, the base preferably being determined so that it occupies more than 70% and less than 95% of the surface area of the smallest square inside which it can be inscribed, and preferably comprises a perforation passing through the said brick, preferably at its centre, preferably substantially parallel to the said lateral surface, and opening onto the said upper and lower faces of the brick, and preferably comprises a foot, preferably at least two feet, preferably at least three feet, projecting from the said upper face or from the said lower face and preferably comprises a housing, preferably at least two housings, preferably at least three housings, preferably the same number of housings as the number of feet, on the opposite face to the face that bears the protruding feet, so that the feet of another identical brick can become housed in the said housings (which does not mean to say that the brick will necessarily be assembled with identical bricks in a stack).

Figure 6:
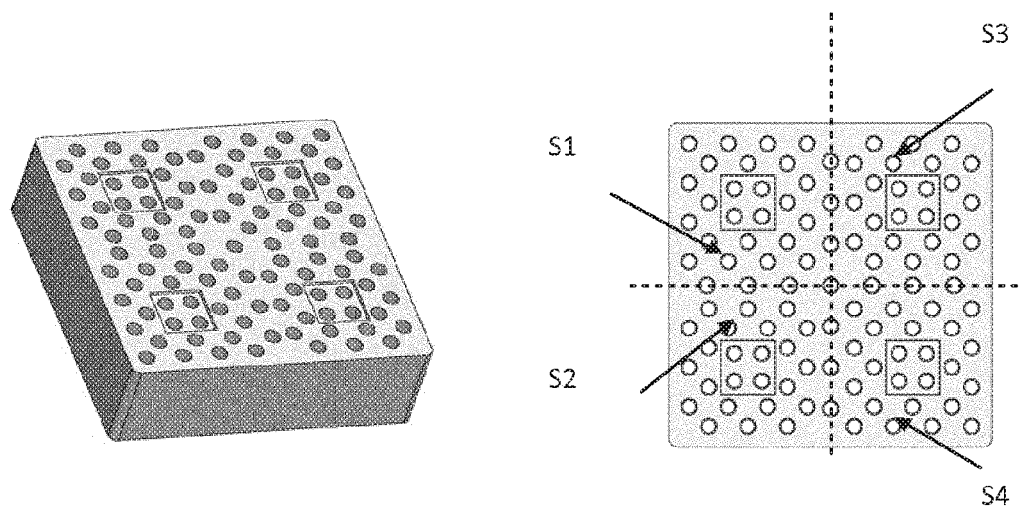
FIGS. 6 and 7 depict a brick according to the invention intended for a thermal storage unit.
Figure 7:
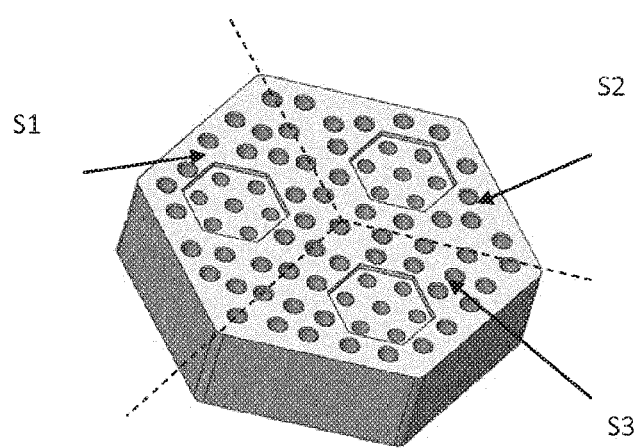

FIGS. 6 and 7 depict bricks according to the invention, in another preferred embodiment.

In this second particular embodiment, a brick according to the invention:

comprises an upper face, a lower face, preferably parallel to the said upper face, and a lateral surface extending substantially in a virtual cylinder, between the said upper and lower faces and preferably perpendicular to the said upper and lower faces, the virtual cylinder having a base, preferably polygonal, preferably square, hexagonal or octagonal, preferably hexagonal, preferably of regular shape, and comprises several perforations, passing through the said brick, preferably substantially parallel to the said lateral surface, and opening onto the said upper and lower faces of the brick, the number of said perforations preferably being greater than 20, preferably greater than 30, preferably greater than 40, preferably greater than 50, preferably greater than 60, more than 50%, preferably more than 70%, preferably more than 90%, preferably substantially all the perforations each having a mean equivalent diameter greater than 5 mm, preferably greater than 10 mm, and preferably less than 25 mm, preferably less than 20 mm, and preferably comprises at least one foot, preferably at least two feet, preferably at least three feet protruding from the said upper face or from the said lower face, and preferably comprises at least one housing, preferably at least two housings, preferably at least three housings, preferably the same number of housings as the number of feet, on the opposite face to the face that has the protruding feet, so that the feet of another identical brick can be housed in the said housings, and has a void volume fraction less than or equal to 60%, preferably less than or equal to 50%, preferably less than or equal to 40%, preferably less than or equal to 30%, preferably less than or equal to 25%, or even less than or equal to 20% and/or greater than or equal to 10%, preferably greater than or equal to 15%, and preferably has a configuration that allows the degree of closure to be modified according to the arrangement of the brick, preferably according to the angular position of the said brick about its centre and preferably without having to alter the arrangement of adjacent identical bricks of the same stratum (in other words, the space occupied by the brick is the same in several different arrangements, corresponding to different degrees of closure); and preferably has a mass of between 10 kg and 25 kg.

In this preferred embodiment, the perforations can be of any shape. For preference, the perforations are cylindrical, preferably with a circular and/or oblong base, preferably with a circular base.

The perforations may be distributed irregularly through the brick. For preference, when the upper face of a brick is viewed, the perforations may be distributed in a plurality of sectors S1-S4 (FIGS. 6 and 7), delimited by lines passing through perforations, the latter being considered not to belong to any sector.

For preference, the number of sectors is greater than or equal to 2, 3 or 4.

For preference, the perforations are distributed evenly in each sector. Within a sector, the perforations preferably form, on the upper or lower face of the brick, a pattern that is symmetrical with respect to the centre of the sector concerned. The patterns may be identical in several sectors. For example, in FIG. 6, the patterns in sectors S1 and S4 may be identical and the patterns in sectors S2 and S3 may be identical. All the sectors may also have different patterns, as in FIG. 7.

For preference, at least one perforation is spaced apart from the adjacent perforations by a distance that can vary according to the adjacent perforation considered.

This configuration is particularly advantageous because it allows the combined degree of closure for all of the perforations of the brick to be varied easily simply by rotating this brick.

For example, if a stack is made up of bricks of hexagonal shape having 3 sectors, like those depicted in FIG. 7, the combined degree of closure for all of the perforations will differ according to whether a sector of a brick in the upper stratum, for example sector A, is resting on sector B or sector C of a brick of the lower stratum. Such a brick according to the invention thus makes it possible, according to the various patterns chosen for each of these sectors, easily to adjust the degree of closure by choosing which sectors to superpose. Advantageously also, rotating a brick through 120° or through 240° allows it to be repositioned in the same space as it occupied initially.

The bricks may be manufactured by any shaping technique known to those skilled in the art, notably by extrusion, pressing or casting. For preference, the bricks are manufactured by extrusion or by pressing.

The bricks are then preferably heat treated to sinter them. The sintering conditions, including amongst other things the maximum temperature reached, the time held at this temperature, the rate of temperature increase and decrease, and the atmosphere, are dependent on the material of which the brick is made. In one embodiment, the material of which the brick is made contains more than 50%, preferably more than 60%, preferably more than 70%, or even more than 80% by mass of iron oxides and the sintering cycle has a maximum attained temperature of between 1050° C. and 1450° C., or even between 1050° C. and 1350° C., and the time held soaking at this temperature is between 15 minutes and 12 hours.

Assembling the bricks presents no particular difficulty and can be carried out using the habitual techniques.

The bricks according to the embodiment of FIG. 4 allow for particularly dense stacking as the void fraction is low.

The voids are limited to the perforations 66, to the interfacial holes 68, to the passages 52 and to the expansion spaces.

They also make it possible quickly and easily to create effective obstacles for deflecting the heat-transfer fluid towards the passages 52.

Furthermore, their geometric shape makes them easier to assemble.

Finally, their feet 54 allow stacking with or without a lateral offset from one stratum to the other, allow passages 52 and expansion spaces to be created quickly and accurately and, by collaborating with the housings 72, give the stack good stability.

The degree of closure is preferably chosen according to the operating constraints, notably the pressure drop permissible across the heat storage unit.

Operation

During charging, the charging heat-transfer fluid enters the thermal storage unit at a charging temperature Tc, preferably substantially constant, generally via the top part of the thermal storage unit. The charging temperature is preferably less than 1000° C., or even less than 800° C. and greater than 350° C., or even greater than 500° C.

The charging heat transfer fluid is for example injected into the stack via the lower opening 44, then enters the lower ducts 48 of a lower stratum 46. Its circulation is impeded by the obstacles 57 which advantageously increase the surface area available for exchange of heat. According to the invention, the obstacles 57 deflect some of the flow of heat-transfer fluid towards the passages 52 so that this part of the flow accesses upper ducts 48' of an adjacent upper stratum 46'. This considerably increases the efficiency with which heat is transferred.

The charging heat-transfer fluid heats up the bricks with which it is in contact. Its temperatures therefore progressively drops.

The low void fraction of the stack gives it a high heat storage capacity.

For preference, the temperature at which the charging heat-transfer fluid leaves the thermal storage unit, at the start of charging, is close to the discharge temperature from the previous cycle.

During discharging, the discharging heat-transfer fluid enters the thermal storage unit at a discharging temperature, preferably substantially constant, for example via the upper part of the thermal storage unit. Conventionally, in the steady state, the temperature is close to the temperature of the bricks with which it then comes into contact, and the heat-transfer fluid heats up rapidly to the latter temperature. The discharge temperature is preferably lower than the charging temperature, for example by more than 100° C., by more than 200° C. or by more than 300° C.

The heat-transfer fluid then continues on its way through the thermal storage unit, cooling the bricks with which it is in contact. Its temperature therefore increases progressively. The exchanges of heat are similar to those encountered during the charging phase if the circuit followed by the flows of charging and discharging heat-transfer fluids are similar.

The thermal storage unit therefore experiences a succession of "cycles", each cycle comprising a charging phase, possibly a phase on standby, then a discharging phase. The duration of a regular cycle is generally greater than 0.5 hours, or even greater than 2 hours and/or less than 48 hours, or even less than 24 hours.

EXAMPLES

The following examples are given for illustrative and nonlimiting purposes.

The following assumptions have been used when performing calculations regarding the heat energy released by the regenerator and how the outlet temperature of the air changes during charging and discharging:
one-dimensional model:
  flow and heat transfer by forced convection through the stack, neglecting the effect of gravity,
  fluid temperature and speed constant in a cross section of the stack,
  thermal losses and influence of the wall of the receptacle on the flow negligible,
  uniform distribution of temperature and fluid flow across the upper face (during charging) and across the lower face (during discharging) of the stack,
  zero resistance to the diffusion of heat through the material of the energy storage elements,
stack of cylindrical shape, constant cross section, diameter equal to 9 m and volume equal to 1909 m$^3$,
energy storage elements: loose in the case of Example 1, outside of the invention, the void fraction being equal to 40%, and in the form of bricks stacked in the form of strata in the case of the other examples:
  in the case of Example 2, outside of the invention, 13.5 strata per metre, each stratum being separated from the adjacent strata by a space of a height equal to 4 mm extending horizontally, each stratum being made up of bricks having perforations of diameter equal to 12 mm, each stratum having a perforations surface density of 1500 per m$^2$, the stack of strata having no obstacles (zero degree of closure), the void fraction being equal to 20%,
  in the case of Example 3, outside of the invention, 14.2 strata per metre, the said strata being stacked with no spaces between the said strata, each stratum being made up of bricks having perforations of diameter equal to 12 mm, each stratum having a perforations surface density of 1500 per m$^2$, the stacking of the strata being such that each perforation has a degree of closure of 67%, as depicted in the outline diagram of FIG. 8, the void fraction being equal to 17%,
  in the case of Example 4, according to the invention, 13.5 strata per metre, each stratum being separated from the next by a space of a height equal to 4 mm extending horizontally, each stratum being made up of bricks having perforations of diameter equal to 12 mm, each stratum having a perforations surface density of 1500 per m$^2$, the stacking of strata being such that each perforation has a degree of closure of 67%, as depicted in the outline diagram of FIG. 9, the void fraction being equal to 20%,
  in the case of Example 5, according to the invention, 13.5 strata per metre, each stratum being separated from the next by a space of a height equal to 4 mm extending horizontally, each stratum being made up of bricks having perforations of diameter equal to 12 mm, each stratum having a perforations surface density equal to 1500 per m$^2$, the stacking of strata being such that half the perforations are completely closed off (degree of closure 100%) as depicted in the outline diagram of FIG. 10, the void fraction being equal to 20%,
  in the case of Example 6, according to the invention, 13.5 strata per metre, each stratum being separated from the next by a space of a height equal to 4 mm extending horizontally, each stratum being made up of bricks having perforations of diameter equal to 12 mm, each stratum having a perforations surface density of 1500 per m$^2$, the stacking of strata being such that all of the perforations are completely closed off (degree of closure 100%) as depicted in the outline diagram of FIG. 11, the void fraction being equal to 20%,
charging and discharging heat-transfer fluid: dry air,
volume of energy storage elements constant,
no radial thermal losses,
charging inlet temperature $T_{ec}$, equal to 800° C., namely 1073 K,
discharging inlet temperature $T_{ed}$, equal to 400° C., namely 673 K,
internal pressure equal to 10 bar,
in charging, the fluid flow rate is constant and equal to 150 kg/s,
in discharging, the fluid flow rate is constant and equal to 75 kg/s,
duration of charging: 5 hours,
duration of discharging: 10 hours,
composition of the frit used for the energy storage elements:

TABLE 1

| Chemical analysis of the energy storage elements | |
|---|---|
| % Iron oxide expressed in the form of $Fe_2O_3$ | 65 |
| % $Al_2O_3$ | 7 |
| % CaO | 0.7 |
| % $TiO_2$ | 0.7 |
| % $SiO_2$ | 24 |
| % other oxides | 2.6 |
| Other features of the energy storage elements | |
| Apparent density of the material of the storage elements (g/cm$^3$) | 3.2 |
| Open porosity (%) | 4 |
| Cp at 25° C. (J kg$^{-1}$ K$^{-1}$) | 650 |
| Cp at 400° C. (J kg$^{-1}$ K$^{-1}$) | 880 |
| Cp at 800° C. (J kg$^{-1}$ K$^{-1}$) | 910 |

Let
$T_{sd}$ be the discharge outlet temperature, which can vary over the duration of the discharge,
$T_{SD}$ be the mean discharge outlet temperature, the duration of the discharge being equal to 10 hours.
The "efficiency" of the thermal storage unit is the name given to the following ratio E, expressed as a percentage:

$$E=(T_{SD}-T_{ed})/(T_{ec}-T_{ed}).$$

The closer the ratio E tends towards 100%, the more efficient the thermal storage unit.
The results of the simulation performed are collated in Table 2 below:

TABLE 2

| Example | Efficiency (%) |
|---|---|
| 1 | 91.9 |
| 2 | 94.2 |
| 3 | Unusable |
| 4 | 95.5 |
| 5 | 95.2 |
| 6 | 97.2 |

The thermal storage units of Examples 4, 5 and 6 show a remarkable improvement in efficiency compared with the thermal storage unit according to Examples 1 and 2.
The storage unit of Example 3 is unusable because it has too high a pressure drop.

The results in Table 3 below show the achievable variation in volume of the storage unit for a target efficiency of 90% and 95%, the thermal storage unit of Example 2 being taken as the reference, a negative variation in volume corresponding to a reduction in volume:

TABLE 3

| Example | Variation in volume of the thermal storage unit for a target efficiency equal to 90% (%) | Variation in volume of the thermal storage unit for a target efficiency equal to 95% (%) |
|---|---|---|
| 1 | +21.7 | +13.3 |
| 2 | reference | reference |
| 4 | −12.3 | −23 |
| 5 | −5.1 | −9.4 |
| 6 | −14.3 | −26.7 |

The thermal storage units of Examples 4, 5, 6 offer a volume that is reduced by 12.3%, 5.1% and 14.3% respectively, in comparison with the storage unit of Example 2 when the target efficiency is 90%.

The thermal storage units of Examples 4, 5, 6 offer a volume that is reduced by 23%, 9.4% and 26.7% respectively, in comparison with the storage unit of Example 2 when the target efficiency is 95%.

This reduction in the volume of the thermal storage unit is accompanied advantageously by a reduction in investment costs.

The results of Table 4 below demonstrate the technical effect associated with the number of closed-off openings. It shows that the efficiency increases appreciably when the number of closed-off openings exceeds 20%.

TABLE 4

| Example | Number of closed-off openings (%) | Efficiency (%) |
|---|---|---|
| 2 | 0 | 94.2 |
| 5 | 50 | 95.2 |
| 6 | 100 | 97.2 |

Of course, the present invention is not restricted to the embodiments described and depicted which are given by way of examples. In particular, combinations of the various embodiments described or depicted also fall within the scope of the invention.

In particular, in FIGS. 6 and 7, the brick has a configuration that allows the degree of closure to be modified according to its layout, preferably according to its angular position about its centre or its axis, and preferably without needing to alter the layout of the adjacent identical bricks of the same stratum. Such a configuration is, however, also possible with other types of bricks and notably with bricks that have just one single perforation.

Neither is the invention limited by the shape or dimensions of the stack.

The invention claimed is:

1. A thermal installation comprising:
a unit producing heat energy,
a thermal storage unit, and
a circulation device which:
during a charging phase, causes a charging heat-transfer fluid to circulate from the unit producing heat energy to the thermal storage unit, then through the thermal storage unit in a first direction, and
during a discharging phase, following the charging charge, causes a discharging heat-transfer fluid to circulate through the thermal storage unit in a second direction opposite to said first direction,
at least one of the charging and discharging heat-transfer fluids, circulating in the stack from the lower duct towards at least one upper duct,
the thermal storage unit comprising:
a receptacle comprising orifices allowing a heat-transfer fluid to be introduced into and extracted from the receptacle, and
a stack of bricks made of a material which at 25° C. has a specific heat capacity higher than 600 J·°C.$^{-1}$·kg$^{-1}$, the bricks being arranged in the receptacle in the form of superposed strata, each stratum of the superposed strata having lower and upper faces and defining a plurality of ducts each opening via lower and upper openings onto the lower and upper faces respectively, each lower opening facing at most one upper opening and each upper opening facing at most one lower opening,
the stack comprising a plurality of passage strata pairs made up of a lower stratum and an upper stratum which is superposed on the lower stratum,
the pair each pair of strata is a passage strata pair being such that the upper and lower faces of the lower stratum and of the upper stratum, respectively, are separated from one another in such a way as to define a passage placing an upper opening of a lower duct of the lower stratum in fluidic communication with at least one lower opening, that is entirely offset with respect to the upper opening, of at least one upper duct of the upper stratum, a maximum height of the passage of the passage strata pair being greater than 1 mm and less than 3 cm,
the stack comprising more than 50% by number of said passage strata pairs, in each of which the upper stratum or the lower stratum comprises at least a brick which overlaps, at least in part, an upper opening or a lower opening, respectively, of said lower stratum or of said upper stratum, respectively, so as to create an obstacle to deflect heat-transfer fluid to flow through the passage of said passage strata pair when heat-transfer fluid is circulating from the bottom of the stack to the top of the stack, or from the top of the stack to the bottom of the stack, respectively, said upper and lower openings being referred to as "closed off upper opening" and "closed off lower opening", respectively,
the stack comprising closed off upper openings and closed off lower openings,
more than 20% by number of the upper openings of the lower stratum being closed-off upper openings and/or more than 20% by number of the lower openings of the upper stratum being closed-off lower openings,
a normal projection of said upper opening or lower opening respectively, of said lower stratum or of said upper stratum, respectively, onto said lower or upper face, respectively, of the upper or lower stratum, respectively, not intersecting any or just intersecting one lower or upper opening, respectively, of said upper or lower stratum, respectively,
the bricks being shaped and configured in such a way that the stack has a void volume fraction less than or equal to 40%,
the mass of the stack being greater than 1 T.

2. Thermal installation according to claim 1, in which, for at least one passage strata pair, the degree of closure of closed-off upper opening is greater than 10%.

3. Thermal installation according to claim 1, in which for at least one passage strata pair, more than 95% by number of the upper openings of the lower stratum of the passage strata pair are closed-off upper openings.

4. Thermal installation according to claim 3, in which for at least one passage strata pair, more than 70% by number of the closed-off upper openings of the passage strata pair are not coaxial with a corresponding lower opening.

5. Thermal installation according to claim 1, in which for at least one passage strata pair, more than 70% by number of the closed-off upper openings of the lower ducts of the lower stratum of the passage strata pair face a corresponding lower opening of an upper duct of the upper stratum of the passage strata pair, the ratio of surface areas of a closed-off upper opening and of the corresponding lower opening being greater than 0.1 and less than 0.9, or greater than 1.1 and less than 10.

6. Thermal installation according to claim 5, in which for at least one passage strata pair, more than 70% by number of the closed-off upper openings of the passage strata pair are coaxial with a corresponding lower opening.

7. Thermal installation according to claim 5, in which for at least one passage strata pair, more than 20% and less than 60% by number of the lower openings of the upper stratum of the passage strata pair are closed-off lower openings.

8. Thermal installation according to claim 1, in which for at least one passage strata pair, the degree of closure of the closed-off upper opening of the passage strata pair is 100%.

9. Thermal installation according to the claim 8, in which for at least one passage strata pair, the degree of closure of more than 70% by number of the closed-off upper openings of the lower stratum of the passage strata pair is 100%.

10. Thermal installation according to claim 9, in which for at least one passage strata pair, more than 50% by number of the closed-off lower openings of the passage strata pair have a degree of closure of 100%.

11. Thermal installation according to claim 1, in which for at least one passage strata pair, the ratio of the number of closed-off upper openings of the passage strata pair to the number of closed-off lower openings of the passage strata pair is between 0.7 and 1.3.

12. Thermal installation according to claim 1, in which for at least one passage strata pair, more than 20% and less than 60% by number of the lower openings of the upper stratum of the passage strata pair are closed-off lower openings.

13. Thermal installation according to claim 1, in which for at least one passage strata pair, more than 50% by number of the closed-off lower openings of the upper ducts of the upper stratum of the passage strata pair face an upper corresponding opening, referred to as a "corresponding" opening, of a lower duct of the lower stratum of the passage strata pair, the ratio of the surface areas of a closed-off lower opening and of the corresponding upper opening being greater than 0.1 and less than 0.9, or greater than 1.1 and less than 10.

14. Thermal installation according to claim 1, in which for at least one passage strata pair, the passage of the passage strata pair extends horizontally.

15. Thermal installation according to claim 1, in which the maximum height of the passage of the passage strata pair is less than 2 cm.

16. Thermal installation according to claim 15, in which the maximum height is less than 1 cm.

17. Thermal installation according to claim 1, in which for at least one passage strata pair, the closer the pair is to one end of the stack, the greater on average is the degree of closure across the passage strata pair.

18. Thermal installation according to claim 1, more than 70% of the bricks of the stack each being a "perforated brick"
- delimited by an upper face, a lower face, and a lateral surface extending in a cylindrical shape between the upper and lower faces; and
- comprising a perforation passing through the perforated brick and opening onto the upper and lower faces,
- the perforation and the lateral surface of the perforated brick being shaped in such a way that, in a strata pair made up of perforated bricks configured in the form of a compact lower stratum and of a compact upper stratum superposed on the lower stratum, all or some of interfacial holes at the interface between the perforated bricks of the lower stratum correspond with perforations of perforated bricks of the upper stratum, and/or all or some of the interfacial holes at the interface between the bricks of the upper stratum correspond with perforations of perforated bricks of the lower stratum,
- an interfacial hole of a stratum being a duct formed between the bricks of the stratum and opening onto lower and upper faces of the stratum,
- correspondence between an interfacial hole and a perforation corresponding to a partial closing-off of at least one of the openings of the interfacial hole and of the perforation opposite,
- a stratum being compact when the bricks of which it is made up are arranged in the most compact arrangement as possible.

19. Thermal installation according to claim 18, in which the base of the cylindrical shape is shaped to occupy more than 70% and less than 95% of the surface area of the smallest square in which it can be inscribed, and/or having a void volume fraction less than or equal to 60% and greater than or equal to 10%.

20. Thermal installation according to claim 18, in which the base of the cylindrical shape is octagonal and has four long sides parallel in pairs and four short sides parallel in pairs, each short side being adjacent to two long sides.

21. Thermal installation according to claim 18, the perforated brick having just one single perforation and/or in which the perforation extends at the centre of the perforated brick.

22. Thermal installation according to claim 18, the perforated brick
- comprising a foot protruding from the upper face or from the lower face, and a housing on the opposite face to the face that has the foot, so that a foot of another identical brick can be housed in the housing; and/or
- being made of a material that exhibits the following chemical analysis, in percentage by mass:
  25% < $Fe_2O_3$ < 90%, and
  5% < $Al_2O_3$ < 30%, and
  $CaO$ < 20%, and
  $TiO_2$ < 25%, and
  3% < $SiO_2$ < 50%, and
  $Na_2O$ < 10%,
  provided that $Fe_2O_3 + Al_2O_3 + CaO + TiO_2 + SiO_2 + Na_2O$ > 80%, and
  other oxides: balanced to 100%, and/or
- having a mass greater than 10 kg and less than 25 kg.

23. Thermal installation according to claim 1, more than 70% of the bricks of the stack each being a "perforated brick"
- delimited by an upper face, a lower face, and a lateral surface extending in a cylindrical shape between the upper and lower faces, the cylindrical shape having a base of square, hexagonal or octagonal shape, and
- comprising more than 20 perforations passing through the perforated brick and opening onto the upper and lower faces, and
- having a void volume fraction less than or equal to 60% and greater than or equal to 10%,
- the perforations being shaped and/or distributed and the geometry of the perforated brick being shaped in such a way that, in a strata pair made up of a compact lower stratum made up of perforated bricks and of a compact upper stratum superposed on the lower stratum, each perforated brick can occupy the same space in several operational positions, the mean degree of closure of the upper openings of the perforations of each perforated brick being able to vary according to the operational position adopted.

24. Thermal installation according to claim 23, the perforated brick having a geometry suited to allowing the change in operational position to result from a rotation of the perforated brick.

25. Thermal installation according to claim 23,
- in which more than 50% by number of the perforations each have a mean equivalent diameter greater than 5 mm and less than 25 mm, and/or
- in which the surface density of perforations at the upper surface of the brick is greater than 1000 perforations per square metre.

26. Thermal installation according to claim 1, in which more than 50% by number of the ducts have a cross section all the dimensions of which are greater than 5 mm and less than 100 mm, whatever the plane of section considered.

27. Thermal installation according to claim 1, in which a cycle comprising a charging phase, possibly a phase on standby, then a discharging phase, has a duration greater than 2 hours and less than 48 hours.

28. Thermal installation according to claim 1, wherein the stack comprises a plurality of said obstacles, the obstacles of the stack being shaped so that more than 50% by number of the passages of the stack have heat-transfer fluid passing through them during a charging phase and/or during a discharging phase.

29. Thermal installation according to claim 28, wherein, in the stack, more than 30% of the pairs of two adjacent ducts belonging to one and the same stratum and in fluidic communication via a passage, are configured in such a way that, in a longitudinal plane of section containing the axes of the said adjacent ducts, the obstacles able to deflect heat-transfer fluid coming from the said adjacent ducts into the said passage are not symmetrical.

30. Thermal installation according to claim 1, in which said void volume fraction is less than or equal to 30%.

31. Thermal installation according to claim 1, in which said obstacles are not plugging any duct.

32. Thermal installation according to claim 1, in which a ratio of a number of obstacles that are active in one of said first and second directions of circulation of said heat-transfer fluid to a number of obstacles that are active in the other of said first and second directions of circulation of said heat-transfer fluid is between 0.7 and 1.3.

* * * * *